United States Patent [19]
Hashimoto et al.

[11] Patent Number: 5,680,116
[45] Date of Patent: Oct. 21, 1997

[54] STATIC ROUTING SYSTEM

[75] Inventors: Akira Hashimoto, Tokyo; Hirokazu Tamiya, Shizuoka, both of Japan

[73] Assignee: NEC Corporation, Japan

[21] Appl. No.: 362,244

[22] Filed: Dec. 22, 1994

[30] Foreign Application Priority Data

Dec. 27, 1993 [JP] Japan .................. 5-330280

[51] Int. Cl.$^6$ .................................. H04Q 1/00
[52] U.S. Cl. .................. 340/827; 340/825.08; 370/248; 370/257; 370/457
[58] Field of Search .................. 340/827, 825.02, 340/325.08; 395/200.15; 379/220; 370/85.13, 248, 257, 351, 400, 401, 457, 908, 911

[56] References Cited

U.S. PATENT DOCUMENTS

| | | | |
|---|---|---|---|
| 4,825,206 | 4/1989 | Brice, Jr. et al. | 340/825.02 |
| 5,179,554 | 1/1993 | Lomicka et al. | 370/85.13 |
| 5,329,618 | 7/1994 | Moati et al. | 395/200.15 |
| 5,463,686 | 10/1995 | Lebourges | 379/220 |

*Primary Examiner*—Edwin C. Holloway, III
*Attorney, Agent, or Firm*—Ostrolenk, Faber, Gerb & Soffen, LLP

[57] ABSTRACT

A desired static route is read from a static routing table and a polling is effected on a network connected to a terminal at regular intervals. If a normal response is issued from the network, then information about the above static route is entered in a routing table. If no normal response is delivered from the network, then the information about the static routes entered in the routing table is deleted.

3 Claims, 3 Drawing Sheets

| NETWORK | METRIC | NEXT-HOP | PING-ADDRESS | STAGE | ENTRY | TIME |

FIG. 2

| NETWORK | NEXT-HOP | METRIC |

FIG. 3

| STATE BEFORE POLLING | CHANGE IN STATE BY POLLING | |
|---|---|---|
| | PRESENCE OF RESPONSE | ABSENCE OF RESPONSE |
| ACTIVE | ACTIVE (not changed) | DOUBT |
| DOUBT | ACTIVE | ACTIVE |
| STOP | ACTIVE | STOP (not changed) |

FIG. 4

STATIC ROUTING SYSTEM

BACKGROUND OF THE INVENTION

1. Field of the Invention

The present invention relates to a static routing system suitable for use in a local-area network (LAN) system.

2. Description of the Prior Art

A dynamic routing system such as a RIP (Routing Information Protocol) or the like has heretofore for the most part been used in each of terminals connected to a LAN. In this type of dynamic routing system, a routing table is automatically entered, changed and deleted by transferring routing information between the terminals to thereby ensure communications with a network. When a failure occurs in the network, the entry of the network in the routing table, which is unable to communicate with its corresponding terminal, is erased. Therefore, when a user attempts to communicate with the network, the terminal displays a message such as a "network unreachable" message or the like, which is indicative of a failure to communicate with the network.

However, a static routing system for statically entering a routing table is often used as an alternative to the dynamic routing system because of the demand for security measures taken against unauthorized access or the like.

The conventional static routing system is different from the dynamic routing system in that the routing table is not automatically entered, changed and deleted and communications with the network are not ensured. Thus, even when a failure occurs in a network and a terminal is unable to communicate with the network in which a static route has been entered, the entry of the static route in the network in the routing table remains therein. Therefore, even if the terminal does not display the message indicative of the failure to communicate with the network and the network is actually disconnected from the terminal, the terminal continues to send a packet to the network and a communication request is forcibly cut off depending on a lapse of a time-out period set by the terminal.

The aforementioned conventional static routing system is accompanied by problems that when the terminal is unable to communicate with the network entered due to the network failure as against the network to which the static route has been set, the network to communicate with the terminal must wait for the time-out of the terminal, and this reduces the operability of the network.

SUMMARY OF THE INVENTION

With the foregoing in view, it is an object of the present invention to provide a static routing system capable of avoiding a reduction in operability of a network even if the network to which a static route has been set, fails to communicate due to a network malfunction.

According to one aspect of the invention, for achieving the above object, there is provided a static routing system comprising:

- a routing table operated for effecting routing to other device connected to a local-area network;
- an application program for polling the local-area network;
- a static routing table in which are entered static routes including an address for a network to be routed and a time interval required to perform a polling;
- a timer; and
- controlling means for reading a desired static route from the static routing table and starting the application program so as to poll a corresponding network each time a lapse of a predetermined time is reported from the timer, entering the static route in the routing table when a normal response is sent back from the network and deleting the static route from the routing table when the normal response is not sent back from the network.

According to the present invention, a static route can be entered and deleted as if to enter and delete it under the operation of a dynamic routing system by carrying out a communications test with a network to which the static route has been set. Further, a failure can be detected without waiting for a time-out of a terminal. As a result, a network having high operability can be realized.

The above objects and features as well as other advantages of the present invention will become more apparent from the following description of the preferred embodiment in conjunction with the accompanying drawings.

BRIEF DESCRIPTION OF THE DRAWINGS

FIG. 2 is a view showing the structure of a static routing table 9 employed in the local-area network system shown in FIG. 1;

FIG. 3 is a view showing the structure of a routing table 6 employed in the local-area network system shown in FIG. 1;

FIG. 4 is a view illustrating a change in STATE obtained by pollings; and

DETAILED DESCRIPTION OF THE PREFERRED EMBODIMENT

Figure 1:
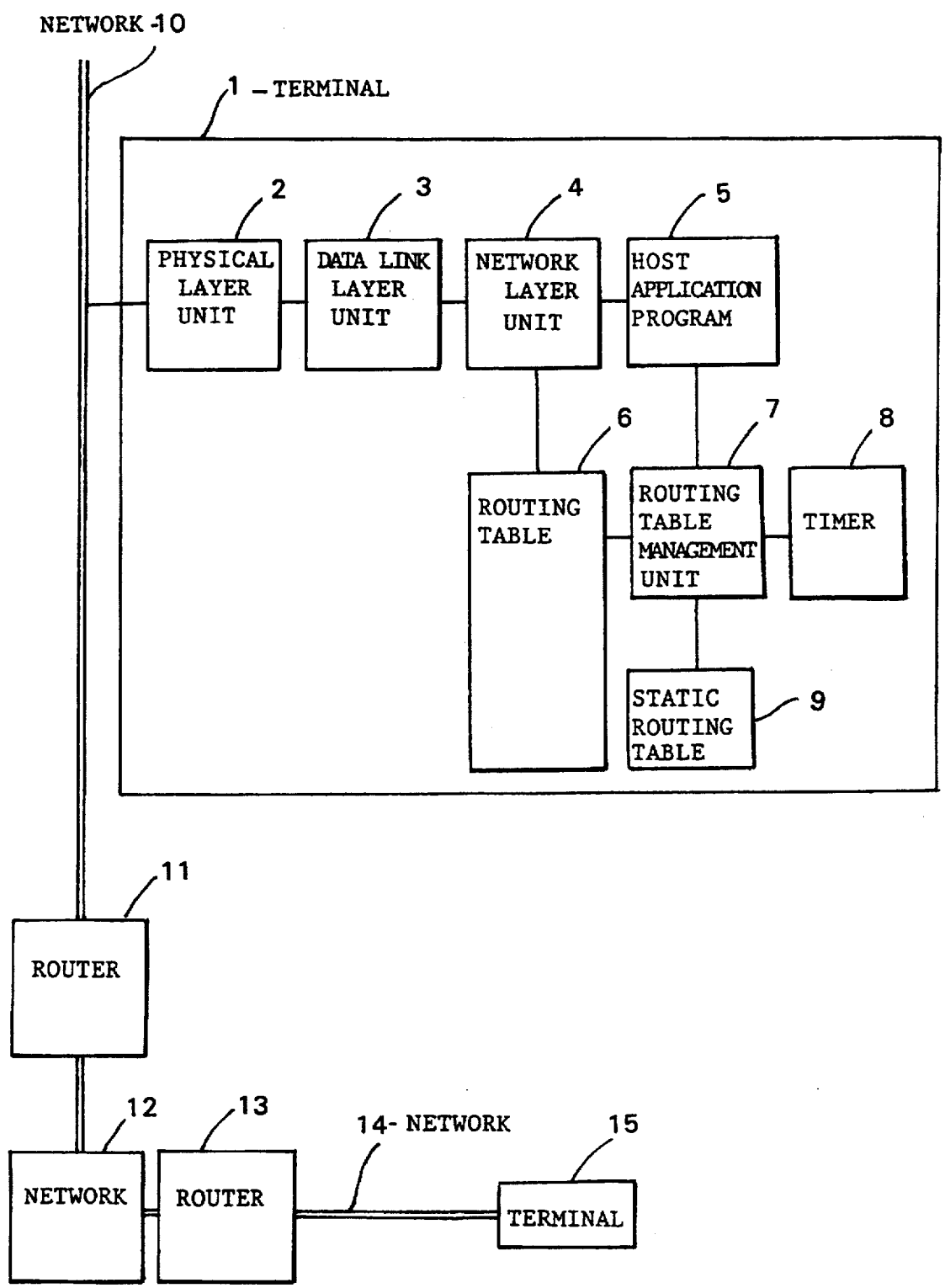
FIG. 1 is a view showing the structure of a local-area network system according to one embodiment of the present invention.
Figure 5:
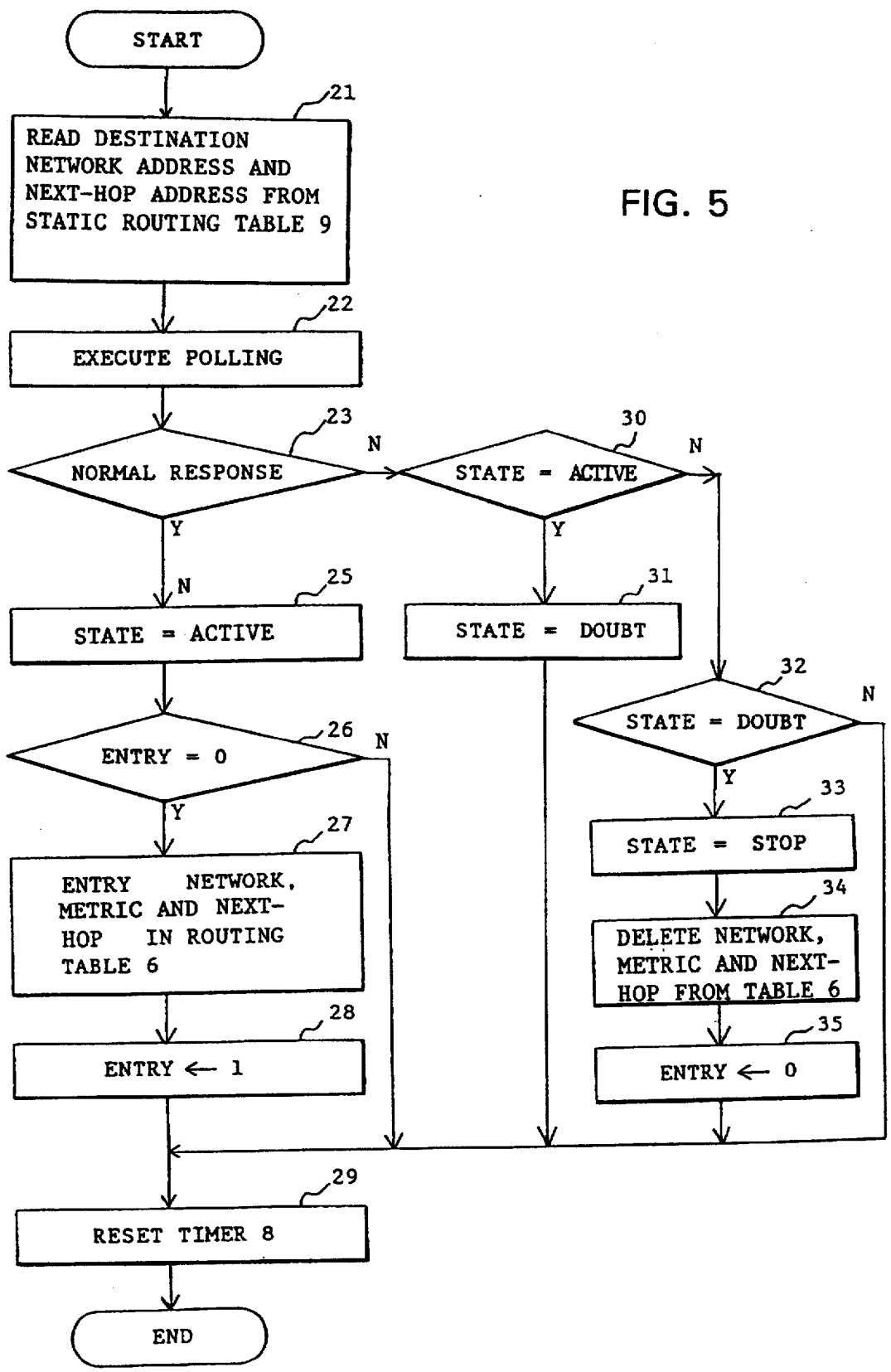
FIG. 5 is a flowchart for describing the operation of a routing table management unit 7.

Referring to FIG. 1, a local-area network system is shown which comprises networks 10, 12 and 14 and router 11 and 13. Further, a terminal 1 is connected to the network 10 whereas a terminal 15 is connected to the network 14.

The terminal 1 comprises a physical layer unit 2, a data link layer unit 3, a network layer unit 4, a host application program 5, a routing table 6, a routing table management unit 7, a timer 8 and a static routing table 9. The terminal 15 comprises a physical layer unit, a data link layer unit, a network layer unit, a routing table, and an application program responsive to the polling from the host application program 5 in the terminal 1.

The static routing table 9 has a structure shown in FIG. 2. A network address for a receive destination network is entered in a column for a "NETWORK" of the static routing table 9. An address for a relay node of the receive destination network is entered in a column for a "NEXT-HOP". The metric which has been counted up to the receive destination network, is entered in a column for a "METRIC". A network address for a network to which a polling is effected to make a confirmation of communications with a corresponding network, is entered in a column for a "PING-ADDRESS". States (Active, Doubt and Stop) of communication between the polling network and its corresponding network are entered in a column for a "STATE". The term "Active" shows a state in which communications are satisfactory. The term "Doubt" shows a state of a possibility that communications are at fault because a response to the first polling is not obtained. The term "Stop" shows an estimated state in which since the response to the polling is not continuously obtained, a failure in communications take place. The "STATE" is changed as shown in FIG. 4 based on the result of polling. The term "ENTRY" shows whether or not the corresponding network has been entered in the routing table 6. Specifically, the term "ENTRY" shows that if the "ENTRY" is found to be "1", then network information is copied from the static routing table 9 to the routing table 6 and if the "ENTRY" is found to be "0", then no network information is copied from the static routing table 9 to the routing table 6. The term "TIME" shows a time interval required to perform the polling.

The routing table 6 has a structure shown in FIG. 3. When a normal response is issued from a polling destination, the contents of "NETWORK", "NEXT-HOP" and "METRIC" of the static routing table 9 are copied on the routing table 6.

The routing table 6 has in addition to functions for routing a packet and for making out the routing table 6, a function for making out the static routing table 9, a function for effecting a polling on each of the networks entered in the static routing table 9, a function for copying "NETWORK", "NEXT-HOP" and "METRIC" of a network which has successfully answered the polling onto the routing table 6, a function for deleting a network which has not successfully answered the polling from the routing table 6, a function for setting a time interval required to perform the polling, and a function different from a communicating function of a normal host application program, for referring to the static routing table 9 other than the routing table 6 upon routing a polling packet.

The host application program 5 serves as one for executing the polling.

The operation of the present embodiment will now be described with reference to FIG. 4 by the following example in which the terminal 1 effects a polling on the terminal 15 connected onto the network 14.

First of all, the routing table management unit 7 effects entering the static routing table 9 of the terminal 1 as an initial setup. Namely, a network address for the network 14 connected with the terminal 15, an address for the relay node of the network 14, the metric counted up to the network 14, a network address for the network (terminal) to which a polling is effected to make a confirmation of communications with the network 14, and a time interval required to perform the polling are respectively set to the columns for the "NETWORK", "NEXT-HOP", "METRIC", "PING-ADDRESS" and "TIME" of the static routing table 9. Further, "Stop" and "0" are respectively set to the columns for the "STATE" and "ENTRY" of the static routing table 9. The routing table 6 is initialized.

After completion of these initial setups, the routing table management unit 7 reads address a destination network address and NEXT-HOP address from the static routing table 9 in Step 21. In Step 22, the routing table management unit 7 then starts the host application program 5 to make a confirmation of communications with the entered network 14 to effect a polling on the terminal 15. Next, the routine procedure proceeds to Step 23 where the routing table management unit 7 makes a decision as to whether a normal response to a transmitted polling packet has been sent from the terminal 15. If the answer is YES in Step 23, then the routing table management unit 7 sets the "STATE" to the "Active" in Step 25. Next, the routing table management unit 7 determines in Step 26 whether or not the "ENTRY" has been brought to "0". Since the "ENTRY" is taken as "0" in the case of the initial polling, the routing table management unit 7 copies the "ENTRY NETWORK", "METRIC" and "NEXT-HOP" in the static routing table 9 onto the routing table 6 in Step 27. In Step 28, the routing table management unit 7 sets the "ENTRY" to 1. Finally, the routing table management unit 7 resets the timer 8 in Step 29.

When the normal response to the transmitted polling packet is not obtained from the terminal 15 due to a failure in any of the networks 10, 12 and 14 or either one of the Router 11 and 13, the routing table management unit 7 refers to the "STATE" of the static routing table 9 in Step 30 and determines in Step 30 whether the "STATE" has been entered as the "Active". If the answer is YES in Step 30, then the routing table management unit 7 sets the "Doubt" to the "STATE" of the static routing table 9 in Step 31 while holding the "NETWORK", "METRIC" and "NEXT-HOP" which have already been entered in the routing table 6. Thereafter, the routing table management unit 7 resets the timer 8 in Step 29.

If the answer is NO in Step 30, then the routing table management unit 7 refers to the "STATE" of the static routing table 9 again in Step 32. If it is determined in Step 32 that the "STATE" has been taken as the "Doubt", then the routing table management unit 7 sets the "STATE" to the "Stop" in Step 33. Further, the routing table management unit 7 deletes the contents of the routing table 6 in Step 34 and sets "ENTRY" to 0 in Step 35. Thereafter, the routing table management unit 7 resets the timer 8 in Step 29.

If it is judged in Step 32 that the "STATE" has been brought to the "Stop", then the routing table management unit 7 resets the timer 8.

When a predetermined time has elapsed since the timer 8 was reset by the routing table management unit 7 and a time-out signal is outputted from the timer 8, the routing table management unit 7 retrieves the static routing table 9. Thereafter, the routing table management unit 7 starts the host application program 5 to make a confirmation of communications with the entered network 14 to re-effect thereby the polling on the terminal 15.

In entering the static routing table 6, a network address for a specified terminal may be used in place of the network address for the destination network.

While a preferred embodiment of the present invention has been described using specific terms, such description is for illustration only, and it is to be understood that changes and variations may be made without departing from the spirit or scope of the following claims.

What is claimed is:

1. A static routing system comprising:
   a routing table operated for effecting routing to other device connected to a local-area network;
   an application program for polling said local-area network;
   a static routing table in which are entered static routes including an address for a network to be routed, and a time interval required to perform polling;
   a timer; and
   controlling means for reading a desired static route from said static routing table and starting said application program so as to poll a corresponding network each time a lapse of a predetermined time is reported from said timer, entering said static route in said routing table when a normal response is sent back from said network and deleting said static route from said routing table when the normal response is undelivered from said network.

2. The static routing system as claimed in claim 1, wherein said static route table includes an address for a network, an address for a relay node of said network and metrics counted up to said network.

3. The static routing system as claimed in claim 2, wherein said static routing table further includes ENTRY information including first information providing an indication when the static route for said network has been entered in said routing table and second information providing an indication when the static route has not been entered therein and STATE information indicative of communications states with said network, including an "Active" state showing that a normal response to an executed polling is issued and communications are satisfactory, a "Doubt" state indicative of a possibility that communications are faulty because a normal response to one polling is not being obtained and a "Stop" state showing that a failure in communications is estimated to have been produced because the normal response to the executed polling is not being continuously obtained, said ENTRY information and said STATE information being set as initial states to said second information and to said "Stop" state respectively, and said controlling means includes updating means for updating said ENTRY information and said STATE information according to the results of executed polling.

* * * * *